May 28, 1935.  R. H. WORRALL  2,002,515
PRODUCING COLOR IN TELEVISION
Filed Aug. 9, 1932
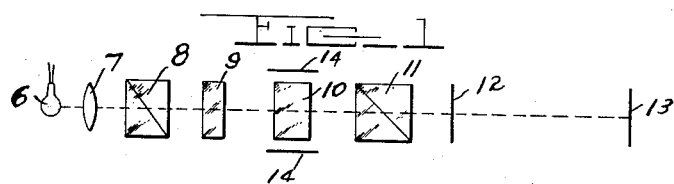
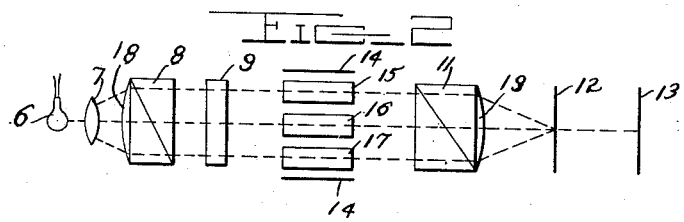
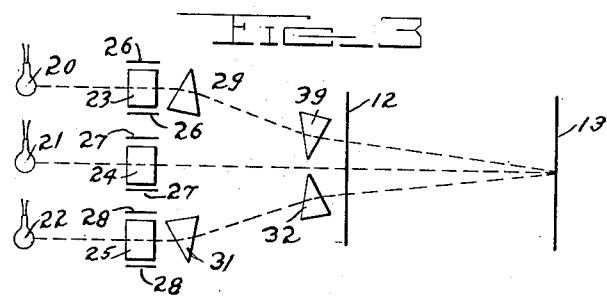
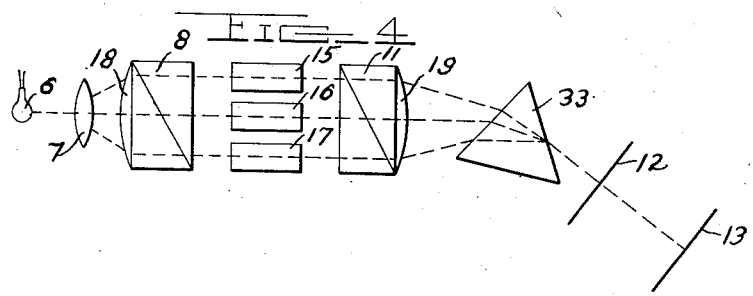
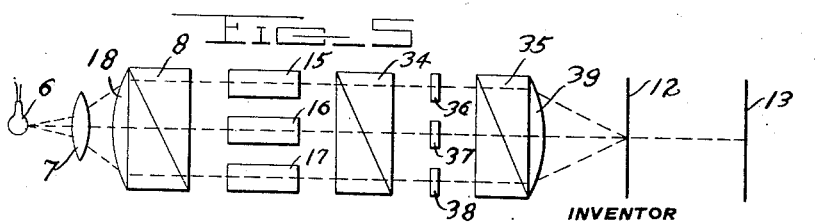
INVENTOR
Robert H. Worrall
BY
ATTORNEY Patented May 28, 1935

2,002,515

UNITED STATES PATENT OFFICE 2,002,515

PRODUCING COLOR IN TELEVISION

Robert H. Worrall, Washington, D. C.

Application August 9, 1932, Serial No. 628,090

12 Claims. (Cl. 178—6)

(Granted under the act of March 3, 1883, as amended April 30, 1928; 370 O. G. 757)

This invention relates to means for producing colors in pictures received by television and has for its object to provide a relatively simple and inexpensive apparatus for reproducing such pictures in tones of two or more colors, instead of in black and white.

With the above and other objects in view, the invention consists in the construction, combination and arrangement of parts as will be described more fully hereinafter.

In the drawing:

Fig. 1 is a schematic representation of one form of my invention in which a single Kerr cell is used;

Fig. 2 is a similar showing of a form thereof in which three Kerr cells are utilized;

Fig. 3 represents diagrammatically another embodiment wherein three Kerr cells are used;

Fig. 4 is in general similar to Fig. 2, but differs therefrom in having a prism to group the colors on the screen;

Fig. 5 shows a modification in which a separate compensator of quartz or other suitable double refractory material is used for each colored beam of light.

It is well known that when a Kerr cell through which a beam of polarized light is passing is subjected to a fluctuating electric or magnetic field, the plane of polarization of the beam is changed and that at different retardations from double refraction the color of the emergent beam is changed. From Dubois' data on refraction, the magnitude of the retardation $r$ in a given substance is a function of B, the activity constant, as defined in the following equation:

$$r = B(L^2/s^2)M \qquad (1)$$

in which M is the length of the path through the optically active substance, $s$ is the distance separating the plates between which the electric potential is applied to that substance, and L is the potential in "Statvolts".

By equation (1) the optical retardation $r$ is proportional to the square of the applied voltage across the Kerr cell. Then for any given change in voltage the change in optic retardation is given by the expression:

$$dr = B(2LdL)M/s^2 \qquad (2)$$

which shows that the optic effect is directly proportional to the originally applied potential. Therefore, the sensitivity of the cell may be made greater by increasing the value of the point about which the potential fluctuates.

If the light originally passed into the crossed Nicol prisms with an intensity $I_0$, the transmitted intensity would be given by the equation $$I = I_0 \sin^2 r \qquad (3)$$

where $r = \text{radius}/2\pi$.

Since B varies with $w$ (the wave length of the light used), I will also vary with $w$, and for $r$ 180°, I will be zero for some value of $w$ leaving a colored field similar to that seen when a very thin plate of quartz is viewed through crossed Nicol prisms.

For nitro-benzene $B = 220 \times 10^{-7}$ when $w = 0.589u$, if we take M as 10 cm., L as 10 statvolts and $s$ as 0.2 cm. and substitute these values in (1) the value of $r$ is 4.95 wave lengths of $4.95 \times 2$ radians path difference which will produce, with the proper analyzing apparatus, various colors.

In Fig. 1 is shown one arrangement for receiving television pictures in colors. The intensity of the light from source 6 falling on screen 13 fluctuates in the same manner as does that received by the transmitter from the subject being televised, as is well known in the art. The beam of light therefrom is directed by lens 7 upon polarizing Nicol prism 8 from which it passes through quartz plate 9 cut parallel to the optic axis, Kerr cell 10 and analyzing prism 11 to distributor 12 whereby the light is caused to move over the screen 13 to produce the image of the subject being sent. Upon plates 14, disposed to set up an electric field that will act upon the optically-active material in cell 10, there is impressed a voltage that fluctuates proportionately to the intensity of the light from the televised picture and in synchronism with the changes of that intensity.

Plates 14 may be given a biasing potential that will give an initial double refraction of the light passing through cell 10 to give any desired initial color. The fluctuations of voltage applied to plates 14 will cause variations in the double refraction and hence will change the color projected upon screen 13. Instead of producing the initial color as just described, quartz plate 9 may be chosen of such thickness as to give, by double refraction, the desired color, which may be black and white, corresponding to zero retardation produced by using the quartz plate to compensate and neutralize the initial retardation. When the starting retardation of double refraction is set at 150° phase retardation, a shade of red results, and a relatively small increase in the retardation shifts the color to purple, but a diminution of the retardation from the original value produces a different shade of red. Thus the apparatus may be adjusted to show the high lights of the image in red and the shadows in purple. Owing to the delicacy of this shift, the variations of light intensity in the televised picture can be shown with lower values of field strength than is possible with black and white.

The application of a bias potential on the optically active element makes possible the use of much higher voltages than those previously utilized and so makes available active materials of greater dielectric strength even though the value of the activity constant B is considerably reduced. For example, if fused quartz were used at a sufficiently high bias potential, the optical rotation with a given signal strength would be greater than that obtained with nitrobenzine in the same cell. In addition to this superior activity the quartz cell possesses the advantages of more stability, greater simplicity, and more desirable optical properties.

It will be obvious to those skilled in this art that if pictures in black and white are desired, all the advantages of the present invention may be preserved by placing the quartz plate 9 between cell 10 and analyzer 11, the plate 9 being of such thickness and optical properties as to reverse and compensate the rotation imparted to the light by the biasing of cell 10. This arrangement permits of utilizing all the benefits derived from such biasing but restores the light to the condition it had before entering the Kerr cell. The condition of the light before and after passing through the biased cell will, in the claims, be denoted "unbiased" and "biased", respectively, for convenience and facility of expression.

The liquid cell deteriorates rapidly and requires a tight container for the liquid, which adds to the difficulty of providing a support for the electrodes. The liquid of the cells absorbs light very easily and any light that falls on the walls of the cell or on the electrodes is absorbed or scattered, thus limiting the length of the cell and the spacing of the electrodes. On the other hand, if quartz is used it does not lose any of its properties with time or exposure to light and the electrodes can be supported by the quartz plates. Light entering one end of a quartz plate is practically all transmitted, since the absorption is very low and any light that strikes the sides is internally reflected. This permits the use of very thin plates which allows close spacing of the electrodes and though the path may be long, the efficiency of transmission is not substantially impaired.

Another embodiment of my invention is disclosed in Fig. 2 wherein the elements that are the same as those in Fig. 1 are given the same reference numerals. However, instead of having a single Kerr cell as in Fig. 1, there are three, designated by 15, 16 and 17. Each of the three cells contains a gas that is selective in its action upon light and actively rotates some particular wave length. For example, cell 15 may be filled with sodium gas, which rotates a yellow sodium line ("D" line), cell 16 may be filled with the vapor of iodine which rotates a green line, and cadmium gas in cell 17 will rotate a red line. It is understood that the cells must be maintained at such temperature as will keep the elements in the form of a gas at suitable density.

A single modulated potential may be applied to all the cells or a separate modulation and a separate potential may be impressed upon each, the result being shown as a three tone picture.

In this form of the invention, a lens 18 is associated with polarizing prism 8 to parallel the beams of light, and the analyzer has a converging lens 19 disposed in such relation thereto that the light emergent from the analyzer is concentrated on the vibrator 12.

Fig. 3 shows three sources 20, 21 and 22, each of which may be a different color from the others, the beams from which pass through the optically active elements 23, 24 and 25, respectively, upon which modulating potentials are impressed by the pairs of plates 26, 27 and 28 to obtain double refractive retardation of the several beams of light and so cause color changes therein. The beams from the outer two cells 23 and 25 are refracted by prisms 29, 30 and 31, 32 to bring them into proper relation to each other for combination into a three-tone picture on screen 13.

In Fig. 4 is shown a form of my invention that is in general similar to that of Fig. 2 but embodies a prism 33 whereby the three beams of light from the active elements 15, 16 and 17, each of which beams is of a different color, are brought together due to the difference in refrangibility of the several wave lengths and projected upon the screen 13 in a three-tone picture. It is understood that each of the active elements is acted upon by suitably modulated fluctuating voltages.

The light from the active elements 15, 16 and 17 in Fig. 5 passes through prisms 34 and 35 and the quartz plates 36, 37 and 38 interposed therebetween. These quartz plates are cut parallel to the optic axis and are of such thickness that light of the desired color is derived from each. As before, the three beams are converged by lens 39 into a single beam for projection upon screen 13.

It is to be noted that the quartz plates used in my invention are cut parallel to the optic axis of the crystal and therefore the colors are produced by double refraction rather than by rotation of the plane of polarization. Quartz plates of this kind may be chosen to balance a field of any two colors desired, for example, green to red or red to blue. Pictures in tints of such colors can be received with a maximum intensity under conditions of minimum change in the field applied across the Kerr cell, which voltage change will be lower than that needed for the reception of pictures in black and white. There is a greater color change for a given voltage change when the double refracting property is used than when the crystal is so cut that the light passes along the optic axis and the colors result from rotation of the plane of polarization.

Another advantageous feature of my invention is in the use of optically polished electrodes in the Kerr cells, whereby light that impinges upon the electrodes is reflected back into the beam and conserved instead of being more or less absorbed by the material of the electrode, as is the case when these elements are not so polished. This makes possible closer spacing of the electrodes than otherwise could be done and hence enhances the electrical efficiency of the cells as well as the optical efficiency thereof.

It will be understood that the above description and accompanying drawing comprehend only the general and preferred embodiment of my invention, and that various changes in the construction, proportion and arrangement of parts may be made within the scope of the appended claims without sacrificing any of the advantages of this invention.

The invention described herein may be manufactured and used by or for the Government of the United States for governmental purposes without the payment of any royalty thereon.

I claim:

1. In a television receiving device, a source of light, a condensing lens disposed to receive light from said source, a polarizing and an analyzing prism disposed in the path of the beam from said lens, a means adapted to change the polarization by double refraction of said light operatively positioned between said prisms, said means including a cell comprising photo active material and means to apply a fluctuating electric field thereto, means for biasing the cell, and means to restore the optical characteristics of the beam back to their unbiased condition.

2. In a television receiving device, a source of light, polarizing and analyzing prisms disposed to receive a beam of light from said source, means responsive to a fluctuating electric field disposed between said prisms to change the polarization of light, means for biasing the first mentioned means, and means to restore the optical characteristics of the beam back to their unbiased condition.

3. In a television receiving device, a source of light, a polarizer and an analyzer disposed to receive a beam of light from said source, means responsive to a fluctuating electric field disposed between said polarizer and analyzer to change the polarization of light, means to produce a colored field through the analyzer by double refraction, and an additional means cooperating with the second means to restore the beam to a predetermined portion of its characteristic.

4. In a television receiving device, a source of light, polarizing and analyzing prisms disposed to receive a beam of light from said source, means adapted to change the polarization of light disposed between said prisms, said means being responsive to a fluctuating electric field, and double refracting means, independent of the first means, operatively positioned between said prisms to produce colored light by double refraction.

5. In a television receiving device, means to polarize light and means to change the polarization thereof, said means being responsive to the fluctuating electric fields and comprising electrodes that are optically polished on their juxtaposed faces.

6. In a television receiving device, means to polarize and analyze light; means responsive to a fluctuating electric field to change the polarization of the light passed therethrough, means for biasing said second means, and means to change the optical polarization of said beam to a predetermined condition of polarization.

7. In a television receiving device, means to polarize light, means responsive to a fluctuating electric field to change the polarization of light passing therethrough, and means to give uniform compensation of the optical path to produce a predetermined condition of double refraction independent of the double refraction caused by the second means about which it is desired to have the field fluctuate.

8. A method of producing colors in television which comprises the steps of polarizing a beam of light, subjecting the polarized light to the action of a strong electric field while passing through a substance that will change the plane of polarization in response to such field, and modifying by double refraction the effect of such field upon the plane of polarization.

9. In a television receiving device, a source of light, polarizing and analyzing prisms disposed to receive a beam of light from said source, a Kerr cell adapted to change the polarization of light disposed between said prisms, said cell being responsive to a fluctuating electric field, means for biasing the cell, and a plate of quartz cut parallel to the optic axis of the crystal and placed normal to the beam and with the optic axis of the quartz crystal set at 45 degrees to the optic axis of the polarizing prism, and of a thickness required to restore the optical characteristics of the beam back to its unbiased condition.

10. In a television receiving device, a source of light, polarizing and analyzing prisms disposed to receive a beam of light from said source, means responsive to a fluctuating electric field to change the polarization of light passed therethrough, means for biasing said second means, and a plate of quartz cut parallel to the optic axis of the crystal and placed normal to the beam and with the optic axis of the quartz crystal set at 45 degrees to the optic axis of the polarizing prism, and of a thickness required to change the optical characteristics of the beam to a predetermined condition of polarization.

11. A method of receiving signals, comprising the steps of passing a beam of light through a polarizing prism, subjecting the light thus polarized to the action of a fluctuating electric field in a device responsive to such electric field to rotate the plane of polarization of said light, biasing said device to a predetermined voltage about which it is desired to have said field fluctuate, reducing to zero the effect upon said light of the biasing voltage, and thereafter passing said light through an analyzer.

12. In a television receiving device, means to polarize light, means responsive to a fluctuating electric field to change the polarization of light passing therethrough, and means to compensate, by double refraction, the optical path for double refraction thereof caused by a relatively high field strength about which it is desired to have the said field fluctuate to produce light having predetermined colors of a particular order.

ROBERT H. WORRALL.